(12) United States Patent
Hirata

(10) Patent No.: US 8,249,434 B2
(45) Date of Patent: Aug. 21, 2012

(54) CONTENTS PLAYING METHOD AND APPARATUS WITH PLAY STARTING POSITION CONTROL

(75) Inventor: Kyouji Hirata, Tokyo (JP)

(73) Assignee: NEC Corporation, Tokyo (JP)

( * ) Notice: Subject to any disclaimer, the term of this patent is extended or adjusted under 35 U.S.C. 154(b) by 1278 days.

(21) Appl. No.: 11/922,606

(22) PCT Filed: Jun. 23, 2006

(86) PCT No.: PCT/JP2006/312625
§ 371 (c)(1),
(2), (4) Date: Dec. 20, 2007

(87) PCT Pub. No.: WO2007/000949
PCT Pub. Date: Jan. 4, 2007

(65) Prior Publication Data
US 2009/0097818 A1 Apr. 16, 2009

(30) Foreign Application Priority Data
Jun. 27, 2005 (JP) .................. 2005-186398

(51) Int. Cl.
*H04N 5/93* (2006.01)
(52) U.S. Cl. ...................................... 386/353
(58) Field of Classification Search .................. 386/353
See application file for complete search history.

(56) References Cited

U.S. PATENT DOCUMENTS

| | | | |
|---|---|---|---|
| 6,816,551 B1 | 11/2004 | Kasutani | |
| 7,280,746 B2 | 10/2007 | Noda | |
| 7,502,547 B2 | 3/2009 | Abe et al. | |
| 2003/0236895 A1 | 12/2003 | Ohkubo et al. | |
| 2004/0101292 A1 | 5/2004 | Noda | |
| 2006/0161742 A1 | 7/2006 | Sugimoto et al. | |

FOREIGN PATENT DOCUMENTS

| | | |
|---|---|---|
| JP | 05-036192 | 2/1993 |
| JP | 10-079930 | 3/1998 |
| JP | 2000-067248 A | 3/2000 |
| JP | 2000-339474 A | 12/2000 |
| JP | 2004-013283 A | 1/2003 |
| JP | 2003-101911 A | 4/2003 |
| JP | 2003-333521 A | 11/2003 |
| JP | 2003-339010 A | 11/2003 |
| JP | 2004-062931 A | 2/2004 |
| JP | 2004-171704 A | 6/2004 |
| JP | 2004-229035 A | 8/2004 |
| JP | 2004-356867 A | 12/2004 |
| JP | 2005-056343 A | 3/2005 |
| JP | 2005-065214 A | 3/2005 |

*Primary Examiner* — Jacob Lipman
(74) *Attorney, Agent, or Firm* — Foley & Lardner LLP

(57) ABSTRACT

Play start position information updater stores play position information in play start position information storage unit based on the stoppage of play of a content. Play start position information exchanger transmits and receives play position information to and from other content playing apparatuses, and stores the received play position information in play start position information storage means. Play start position checker refers to the play position information and determines a play start position.

33 Claims, 10 Drawing Sheets

CONTENTS PLAYING METHOD AND APPARATUS WITH PLAY STARTING POSITION CONTROL

This application is the National Phase of PCT/JP2006/312625, filed Jun. 23, 2006, which claims priority to Japanese Application No. 2005-186398, filed Jun. 27, 2005, the disclosure of which are hereby incorporated by reference in their entirety.

TECHNICAL FIELD

The present invention relates to a method of and an apparatus for playing contents such as music and video contents, and more particularly to a method of and an apparatus for resuming the play of contents from a stop position after the play of the contents has been temporarily stopped.

BACKGROUND ART

There has been proposed an apparatus for playing and viewing contents such as video, music, and other contents in a manner to keep the video, music, and other contents viewable continuously when the contents being viewed are stopped or temporarily stopped, by storing, in the apparatus, a play position upon stoppage of the contents in relation to the contents being viewed, and resuming the play from the stop position based on the information stored in the apparatus when the user instructs the apparatus to play the contents again.

Patent document 1 discloses an apparatus in which when the play of a content is stopped, a program number and a sub-code of a time code are simultaneously read, and saved and stored in a nonvolatile memory, and when a content is to be played, the program number and the time code are read from the nonvolatile memory to start reading data from a corresponding position on the disk.

Patent document 2 discloses an apparatus which holds a memory card, and, when the user interrupts the play of a moving image file, writes a time code at the moment into the memory card. When the moving image file is to be played next time, the time code is read to avoid the trouble of finding where to start the moving image file.

The content playing apparatus disclosed in Patent documents 1, 2 realize continuous play by storing program numbers and time codes, which are unique to the content playing apparatus, in a nonvolatile memory device in a terminal with respect to programs and music pieces that are being played. However, the content playing apparatus suffers from the following problems:

Since the information about a play start point is provided as a combination of a program number and a time code that are unique to the content playing apparatus, the information about the play start point is effective only in the same terminal. Therefore, the content playing apparatus is unable to lend itself to play start point control between a plurality of terminals such as continuous viewing on a plurality of terminals.

The play start point is saved in the form of a program number and a time code in the attached memory in the apparatus. The content playing apparatus does not have a mechanism for allowing the user to select one of a plurality of start point candidates for the same program. The content playing apparatus is unable to control play start points for respective users or to control play start points depending on how the user uses the content playing apparatus or the situation in which the user is placed, based on the log of play details in a plurality of terminals. For example, the content playing apparatus cannot be used to perform a process in which the user views a program on a playing apparatus in a living room, then continuously views the program on a mobile terminal, thereafter views the program on the playing apparatus in the living room regardless of what the user viewed on the mobile terminal, and then views the program on a playing apparatus in the user's own room from the point where the user has stopped viewing the program using the playing apparatus in the living room.

Play start points are generated and updated in a terminal based only on the playing action of the user. Therefore, the content playing apparatus fails to share a certain play situation among a plurality of users, e.g., fail to perform a process in which a user sets a play start point and then causes other users of a plurality of terminals to start playing the content from the same play start point.

If programs stored in a plurality of terminals are not fully identical to each other, then continuous viewing cannot be realized. For example, if recording times of programs are not synchronized and not in full agreement with each other, or if one or both of the contents stored in a plurality of apparatuses are different because of cutting and editing, then since the program IDs are not identical and since the time codes cannot be used, the content cannot be continuously played.

Patent document 1: JP05-036192A (paragraphs 0007-0009)
Patent document 2: JP2003-333521A (paragraphs 0031-0034)

DISCLOSURE OF THE INVENTION

Problems to be Solved by the Invention

It is an object of the present invention to provide a method of and an apparatus for starting to play a content continuously from where the user stopped its play based on the log of viewing details of the same content or contents including identical scenes, if the log of viewing details of the same content or contents including identical scenes is available in an apparatus where the contents are stored or in an apparatus where the content is not stored, when the content stored in the apparatus is to be viewed.

Another object of the present invention is to provide a playing apparatus including a mechanism for selectively determining a play start position based on the log of play details in another terminal, for each user or each terminal, when contents are to be played.

Still another object of the present invention is to provide a playing apparatus which is capable of determining a play start position to realize continuous play even if contents stored in apparatuses are not fully identical to each other due to editing, cutting, and changes in recording situations.

Means to Solve the Problems

According to the present invention, a method of playing stored contents in a terminal comprises the steps of: receiving play start position information indicating a position at which to start playing a content, which is transmitted from another terminal, and storing the play start position information in play start position information storage means, when there is a command to play a content, determining a play start position for the content, by checking the play start position information stored in the play start position information storage means against content information including information about the content, and playing the content from the determined play start position.

According to the present invention, another method of playing stored contents in a terminal comprises the steps of at each terminal: transmitting play start position information generated at a prescribed timing and indicating a position to start playing a content, to a management terminal which manages play start positions in the terminals; at the management terminal; receiving the play start position information transmitted from each of the terminals, and storing the play start position information in play start position information storage means; at one of the terminals which is instructed to play the content; requesting the management terminal for play start position information; at the management terminal; in response to the request from the terminal which is instructed to play a content, transmitting the play start position information to the terminal; at the terminal which is instructed to play a content; receiving the play start position information from the management terminal, and determining a play start position for the content, by checking the received play start position information against content information including information about the content; and playing the content from the determined play start position.

According to the present invention, an apparatus for playing stored contents comprises play start position information exchanging means for receiving play start position information indicating a position at which to start playing a content, which is transmitted from a terminal other than the apparatus, and storing the play start position information in play start position information storage means; and play start position checking means for checking, when there is a command to play a content, the play start position information stored in the play start position information storage means against content information including information about the content to determine the play start position for the content.

According to the present invention, another apparatus for playing stored contents comprises play start position information exchanging means for transmitting play start position information generated at a prescribed timing and indicating a position at which to start playing the content, to a management terminal which manages play start positions in the terminals, receiving the play start position information transmitted from the management terminal, and storing the play start position information in play start position information storage means; control means for requesting the management terminal for play start position information when there is a command to play a content; and play start position checking means for checking the play start position information stored in the play start position information storage means against content information including information about the content to determine the play start position for the content According to the present invention, a program for enabling a computer in a terminal to playing stored contents controls the computer to perform a process of receiving play start position information indicating a position to start playing a content, which is transmitted from another terminal, and storing the play start position information in play start position information storage means; and a process of determining, when there is a command to play a content, a play start position for the content, by checking the play start position information stored in said play start position information storage means against content information including information about the content.

According to the present invention, another program for enabling a computer in a terminal to playing stored contents controls the computer to perform a process of transmitting play start position information generated at a prescribed timing and indicating a position at which to start playing a content to a management terminal which manages play start positions in a plurality of terminals; a process of requesting the management terminal for play start position information when there is a command to play the content; and a process of receiving the play start position information from the management terminal, determining a play start position for the content, by checking the received play start position information against content information including information about the content.

According to the present invention, a content playing system comprises a plurality of content playing apparatuses for playing stored contents, the content playing apparatus being connected to each other by way of a communication network, each of the content playing apparatuses comprising control means for requesting one or more of the other content playing apparatuses for play start position information indicating a position at which to start playing a content when there is a command to play a content; play start position information exchanging means for receiving play start position information transmitted from the one or more of the other content playing apparatuses, and for storing the play start position information in play start position information storage means; and play start position checking means for checking the play start position information stored in the play start position information storage means against content information including information about the content to determine the play start position for the content.

According to the present invention, another content playing system comprises a plurality of content playing apparatuses for playing stored contents, the content playing apparatuses being connected to each other by way of a communication network, each of the content playing apparatuses comprising play start position information exchanging means for, when it has generated play start position information indicating a position at which to start playing a content, transmitting the play start position information to one or more of the other content playing apparatuses, for receiving play start position information from the one or more of the other content playing apparatuses, and for storing the play start position information in play start position information storage means; and play start position checking means for checking, when there is a command to play a content, the play start position information stored in the play start position information storage means against content information including information about the content to determine the play start position for the content.

According to the present invention, still another content playing system comprises a plurality of content playing apparatuses for playing stored contents, the content playing apparatuses being connected to each other by way of a communication network, each of the content playing apparatuses comprising play start position information exchanging means for generating play start position information that has been transmitted indicating a position to start playing the content, for transmitting the play start position information to one of the content playing apparatuses when the one of the content playing apparatuses is indicated, for receiving play start position information from the indicated one of the content playing apparatuses, and for storing the play start position information in play start position information storage means; and play start position checking means for checking the play start position information stored in play start position information storage means against content information including information about the content to determine the play start position for the content; wherein a terminal indicated by said user comprises play start position information exchanging means for receiving the play start position information transmitted from the content playing apparatus and for transmitting the play start position information to one or more of the other content playing apparatuses.

According to the present invention, a content play control server for providing play start position information indicating a position at which to start playing a content to one or more terminals connected through a communication network, comprises play start position information exchanging means for receiving play start position information transmitted from the one or more terminals and indicating a position at which to start playing the content, storing the play start position information in play start position information storage means, and for transmitting the play start position information stored in the play start position information storage means to the one or more terminals when there is a command to play the content.

When the user selects a content and enters a content play request, the play start position checking means checks the play start position information stored in the play start position information storage means against the content that is instructed to be played, and determines a play start position for the content indicated by the user. The content playing means reads the content from the content storage means, and starts playing the content from the play start position output by the play start position checking means. At this time, the play start position information exchanging means reads play start position information generated by another terminal and stores the play start position information in the play start position information storage means. Therefore, the play start position checking means can determine a play start position based on the play position information of the other terminal. The content can thus continuously be played on a plurality of terminals.

The play start position information exchanging means transmits play start position information generated by a certain terminal to a plurality of terminals, and the play start position information exchanging means of the plural terminals store the received play start position information in the play start position information storage means and check the received play start position information against content transmitted by the user commander means at the respective terminals, thereby checking and determining a play start position for play. In this manner, the play start position information generated by the certain terminal can be shared.

If the content playing apparatus further includes play start position updating means for updating the play start position based on a content stop request, then the latest play start position information can be held at the terminal based on the play state of the terminal. When the play start position information exchanging means transmits the latest play start position information to another terminal, the other terminal is capable of detecting a play start position based on the present play state of the terminal. Accordingly, the content played on the terminal can be continuously played on the other terminal.

If the content playing apparatus further includes play start position information storage means for storing a plurality of items of play start position information depending on the user or the situation of the terminal, and includes play start position information selecting means for selecting play start position information from the plurality of items of play start position information, then the play start position information can be used depending on the user or the situation.

The play start position information includes visual information or acoustic information at or near the play start position, and, when the content is instructed to be played in the terminal, the play start position checking means checks the visual information or acoustic information of the content instructed to be played against the visual information or acoustic information stored as content play position information. Consequently, even if the content suffers a mismatch due to partial cutting or editing of the content, the content can be continuously played.

The play start position information is stored in the play start position information storage means for each of the conditions in which the play start position information is obtained. When the play start position checking means check the play start position information, the play start position checking means determine a play start position under a condition indicated by the user based on either an updated time and date or a play start position among play start positions of corresponding content which are obtained from the play start position information under the respective conditions. Accordingly, a content played under a plurality of conditions can be continuously played.

BEST MODE FOR CARRYING OUT THE INVENTION

1st Exemplary Embodiment

Figure 1:
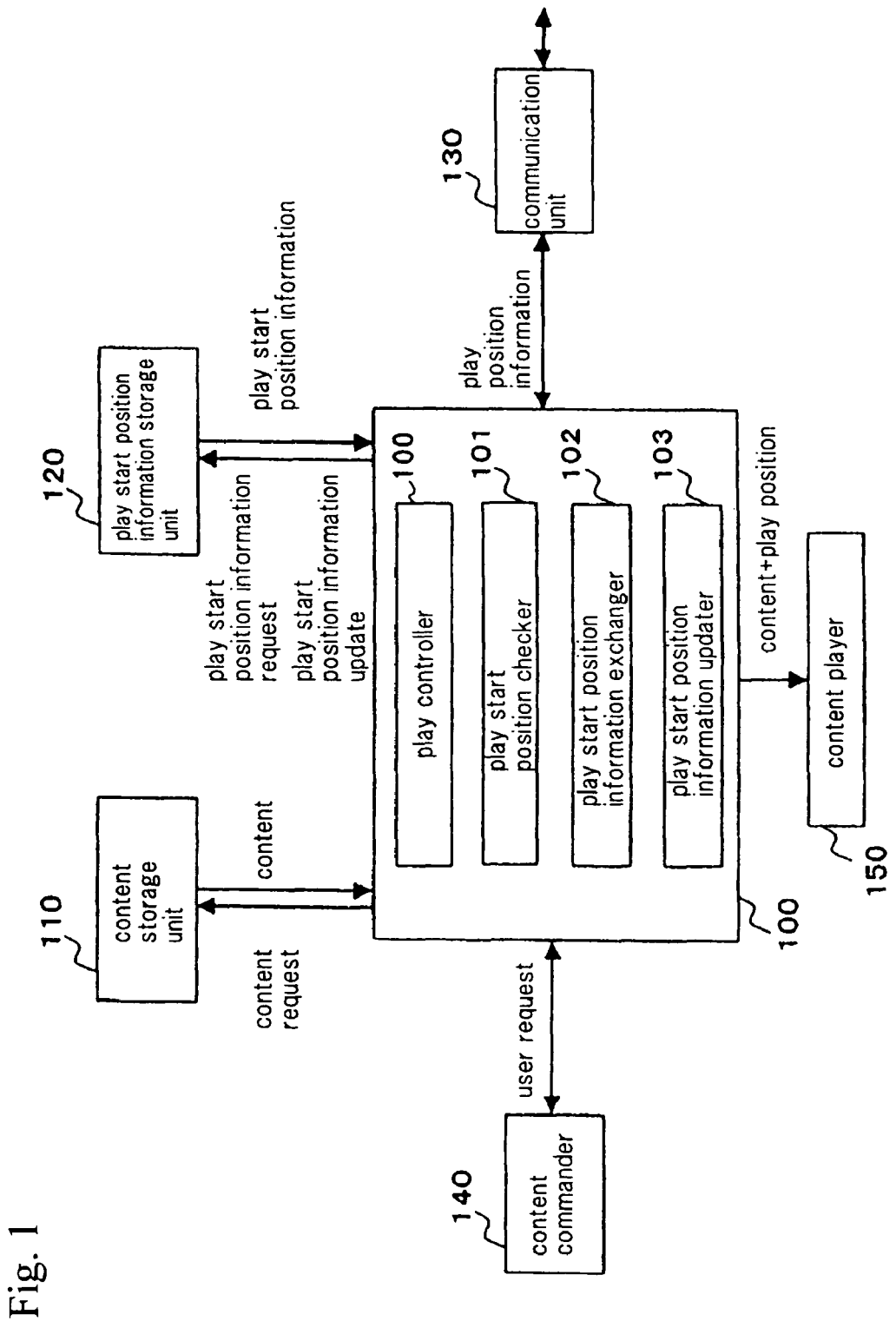
FIG. 1 is a block diagram of a content playing apparatus according to a first exemplary embodiment of the present invention.

Referring now to FIG. 1, a content playing apparatus according to a first exemplary embodiment of the present invention comprises play controller 100, play start position checker 101, play start position information exchanger 102, play start position information updater 103, content storage unit 110, play start position information storage unit 120, communication unit 130, user commander 140, and content player 150.

Content storage unit 110 stores content information including information about contents to be played. The stored content information refers to general medium information to be played in a time-series manner, including program video produced by receiving and recording broadcast programs, etc., video information such as commercially available DVDs (Digital Versatile Discs), private video captured by image capturing equipment owned by individuals, video information such as corporate video produced by recording conferences, lectures, and manuals produced by corporations, music information produced by receiving and recording radio broadcasts, etc., music information such as commercially available CDs (Compact Discs), etc., and audio information such as sound information recorded through microphones by individuals and corporations. Content storage unit 110 may not necessarily be of a single format, but may be a combination of storage unit devices including a CD, a DVD, and a hard disk.

Play start position information storage unit 20 stores play start position information of each of the contents. The play start position information is information representative of a position at which the contents start being played. The play start position information may be information comprising a pair of a content ID for identifying a content to be played and time code information descriptive of a time at which the content start being played, or information such as medium analysis information including one or both of visual and acoustic information at or near a play start position. The play start position information is required to derive a play start point when a content to be played is given.

The content information also includes information required to identify a content to be played based on the play start position information. The content information is information including a content ID, a content title, and content frame information, for example. It is possible to retrieve corresponding play start position information from content information.

Communication unit 30 transmits and receives connection information required for an information exchange between content playing apparatuses, and transmits and receives play start position information between the apparatuses. A plurality of content playing apparatuses may directly be connected to each other, or the content playing apparatuses may be connected to a network for communication with one or plural content playing apparatuses through the network.

User commander 140 is an input device for the user to enter command requests with respect to the play of contents, and may be a keyboard, a mouse, etc. The command requests, with respect to the play of contents, represent information such as a content name for identifying content, and information including requests for instructing the apparatus to play and to stop contents and requests for instructing the apparatus to send and to acquire play start position information.

Content player 150 plays a content based on the content information and the play position information which are indicated by play controller 100.

Play controller 100 issues control instructions to play start position checker 101, play start position information exchanger 102, and play start position information updater 103 based on command request entered by the user and preset information, for thereby performing play control in general.

When the user operates user commander 140 to enter a play request for a content, play start position checker 101 reads play start position information of the contents indicated by user commander 140 from play start position information storage unit 120, and specifies a play start position. Specific details of operation of play start position checker 101 will be described later. Play start position checker 101 may read play start position information of another terminal directly from play start position information exchanger 102.

Play start position information exchanger 102 transmits and receives play start position information to and from another content playing apparatus via communication unit 130. Specifically, play start position information exchanger 102 performs a process of reading play start position information from play start position information storage unit 120 and transmits the play start position information to another content playing apparatus via communication unit 130, and performs a process of writing play start position information received from another content playing apparatus into play start position information storage unit 120.

When the user operates user commander 140 to enter a content stop request, play start position information updater 103 extracts start position information that is representative of a position at which the content that has been requested to be stopped are then stopped from being played, and updates the play start position information stored in play start position information storage unit 120.

Figure 2:
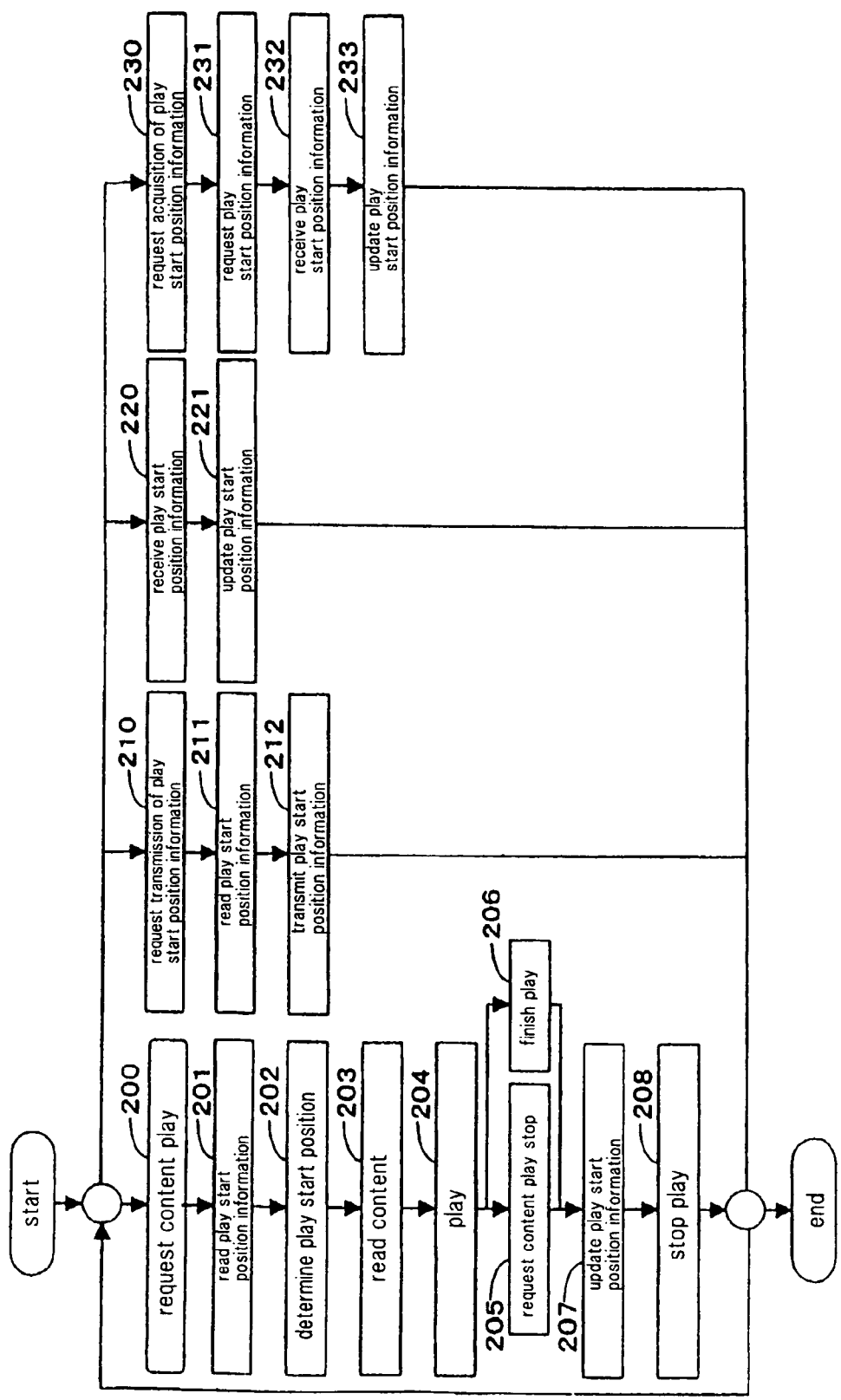
FIG. 2 is a flowchart of a processing sequence of the content playing apparatus according to the first exemplary embodiment of the present invention.

Operation of the content playing apparatus according to the present exemplary embodiment will be described below with reference to the block diagram shown in FIG. 1 and a flowchart shown in FIG. 2.

When a play request that specifies a content is entered from user commander 140 in step 200, play start position checker 101 reads play start position information from play start position information storage unit 120 in step 201, and derives a play start position in step 202. In step 203, play controller 100 reads content information from content storage unit 110, and outputs the content information and the play start position derived by play start position checker 101 to content player 150. In step 204, content player 150 starts playing the content from the play start position. Instead of playing the content from the play start position, content player 150 may start playing the content from the section immediately prior to the play start position or from a point that is a given time ahead of the play start position, whichever the user may select as required. If a content play stop request is entered from user commander 140 in step 205, or if the play of the content is finished in step 206, play controller 100 extracts the present play position information. In step 207, play start position information updater 103 updates the play start position information with the play position information and stores the play start position information in play start position information storage unit 120. In step 208, play controller 100 stops playing the content.

When a play start position information transmitting command request is entered from user commander 140 or a play start position information transmitting command is received from another content playing apparatus via communication unit 130 in step 210, play start position information exchanger 102 reads play start position information from play start position information storage unit 120 in step 211, and transmits the play start position information to an indicated terminal via communication unit 130 in step 212.

When play start position information is received from another content playing apparatus via communication unit 130 in step 220, play start position information exchanger 102 writes the received play start position information in play start position information storage unit 120 to update the information stored therein, in step 221.

When a play start position information acquisition command request is entered from user commander 140 in step 230, play start position information exchanger 102 transmits a play start position information request to another content playing apparatus via communication unit 130 in step 231, and receives play start position information via communication unit 130 in step 232. In step 233, play start position information exchanger 102 writes the play start position information in play start position information storage unit 120 to update the information stored therein.

According to the present exemplary embodiment, when play start position information exchanger 102 exchanges play position information between apparatuses to play contents, the exchanged play position information and the contents stored in the apparatuses are checked against each other. Consequently, the same content can continuously be played on a plurality of terminals.

2nd Exemplary Embodiment

According to the first exemplary embodiment, play start position information storage unit 120 stores play start position information indicative of position information from which play is started, for each of the contents. According to the present exemplary embodiment, a plurality of items of play start position information are held for respective terminals, respective users, or respective situations, and when play start position information is checked, updated, or exchanged, the play start position information to be used is selected and used.

Figure 3:
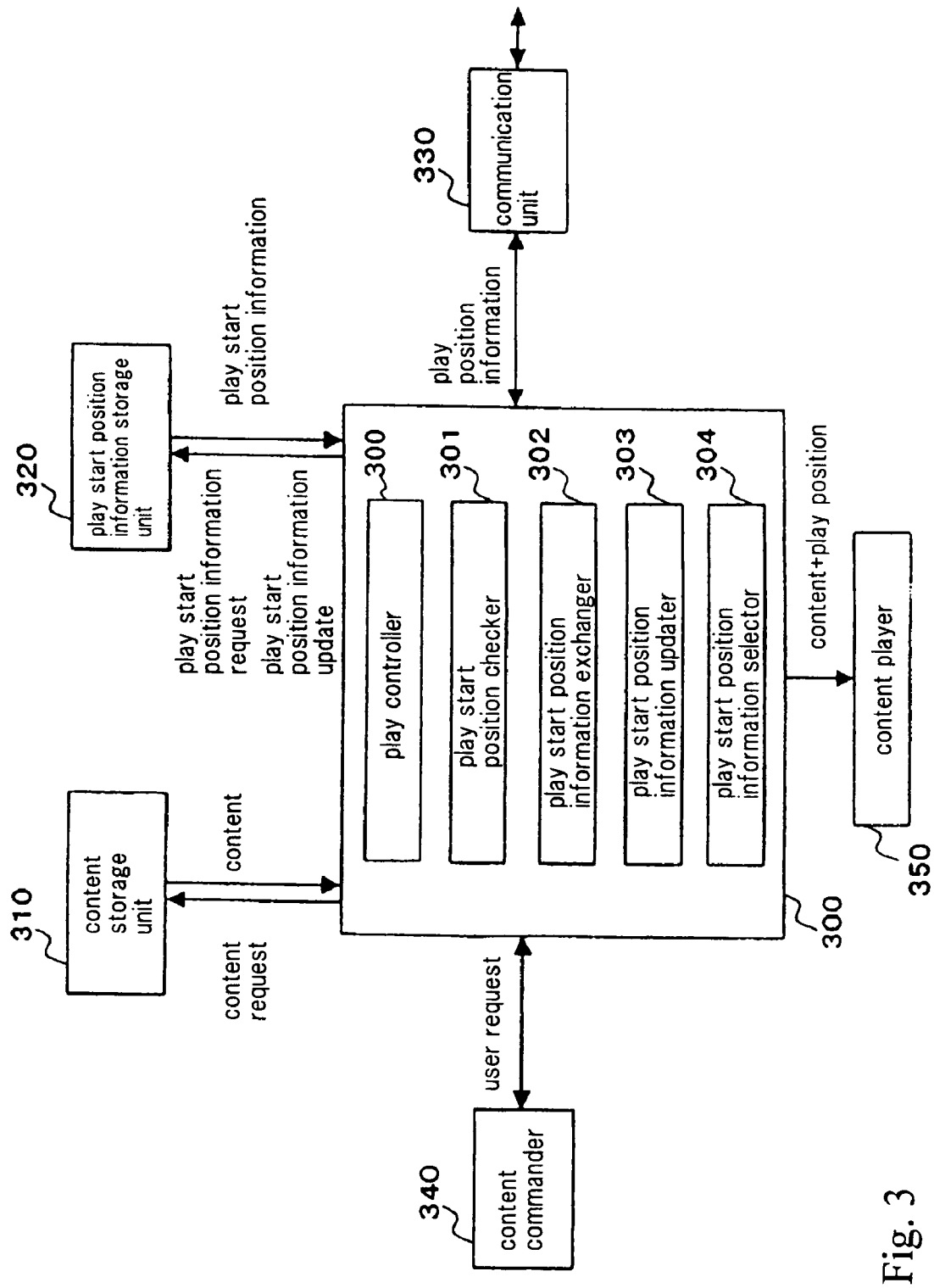
FIG. 3 is a block diagram of a content playing apparatus according to a second exemplary embodiment of the present invention.

Referring to FIG. 3, the content playing apparatus according to the second exemplary embodiment comprises play controller 300, play start position checker 301, play start position information exchanger 302, play start position information updater 303, play start position information selector 304, content storage unit 310, play start position information storage unit 320, communication unit 330, user commander 340, and content player 350.

Content storage unit 310 stores content information about the content to be played. The stored content refers to general medium information to be played in a time-series manner, including program video produced by receiving and recording broadcast programs, etc., video information such as commercially available DVDs, private video captured by image capturing equipment owned by individuals, video information such as corporate video produced by recording conferences, lectures, and manuals produced by corporations, music information produced by receiving and recording radio broadcasts, etc., music information such as commercially available CDs, etc., and audio information such as sound information recorded through microphones by individuals and corporations. Content storage unit 310 may not necessarily be of a single format, but may be a combination of storage unit devices including a CD, a DVD, and a hard disk.

Play start position information storage unit 320 stores play start position information, which refers to information indicative of a position at which the content start being played, of each of contents. The play start position information may be information comprising a pair of a content ID for identifying a content to be played and time code information descriptive of a time at which the content start being played, or information such as medium analysis information including one or both of visual and acoustic information at or near a play start position. The play start position information is required to derive a play start point when a content to be played is given.

Figure 5:
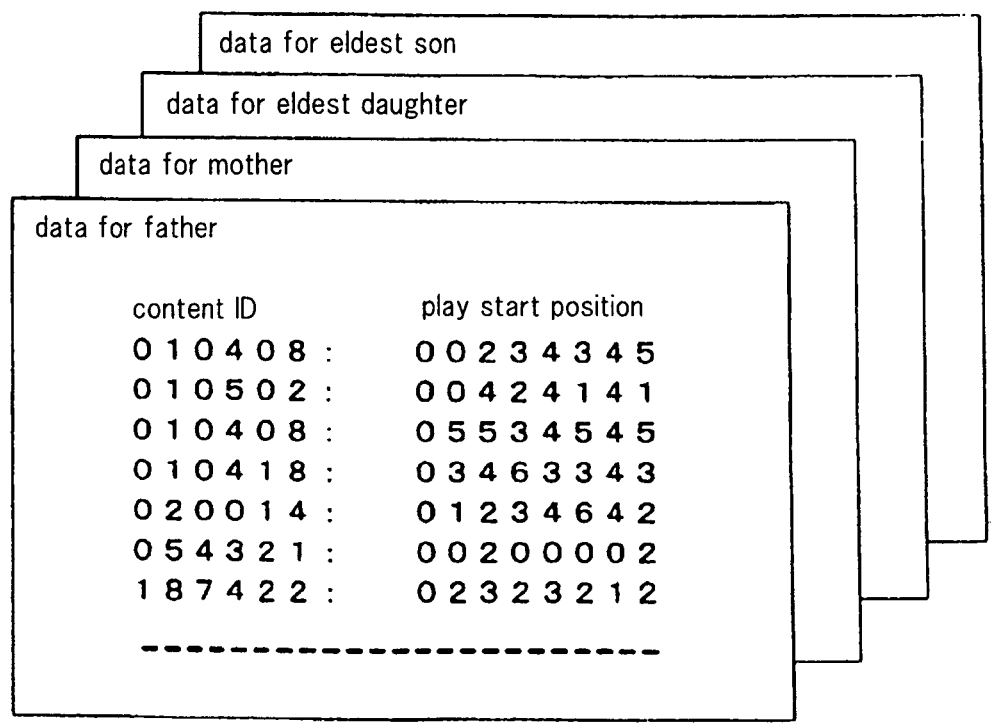
FIG. 5 is a diagram showing an example of content play start position information stored in a content play start position information storage means.

Play start position information storage unit 320 holds a plurality of items of play start position information for respective terminals, users, or situations, and records a set of information indicating at which stage data are used and indicating play start position information of each of contents. FIG. 5 is a diagram showing an example of play start position information. In the example shown in FIG. 5, play start position information storage unit 320 holds play start position information for respective users.

FIG. 5 shows a case of family use wherein users include a father, a mother, an eldest daughter, and an eldest son, and content IDs and play start positions of the respective users are recorded. Play start position information may be information for each of devices such as mobile telephone A, mobile telephone B, and living room computer A, and one person may have a plurality of items of play start position information as indicated by father 1 and father 2. A content described in each item of play start position information may be the same content, or may be a content included in one of the items of play start position information and not included in another one of the items of play start position information.

Communication unit 330 transmits and receives connection information required for an information exchange between content playing apparatuses, and transmits and receives play start position information between the apparatuses. A plurality of content playing apparatuses may directly be connected to each other, or the content playing apparatuses may be connected to a network for communication with one or plural content playing apparatuses through the network.

User commander 340 is an input device for the user to enter command requests with respect to the play of contents, and may be a keyboard, a mouse, etc. The command requests with respect to the play of contents are requests for instructing the apparatus to play and stop contents and requests for instructing the apparatus to send and acquire play start position information.

Content player 350 plays a content based on the content information and the play position information which are indicated by play controller 300. Play controller 300 outputs control instructions to play start position checker 301, play start position information exchanger 302, play start position information updater 303, and play start position information selector 304 based on command request entered by the user and preset information, for thereby performing play control in general.

Play start position information selector 304 selects play start position information to be used according to conditions from a plurality of items of play start position information stored in play start position information storage unit 320. According to a process in which play start position information selector 304 selects play start position information, the user enters information for identifying a content, a user name, and a terminal ID from user commander 340, and play start position information selector 304 selects play start position information from play start position information storage unit 230 based on the entered data. Alternatively, instead of the user entering commands, the user, the terminal, etc. may be automatically identified through the use of in cooperation with sensor information such as camera information or the like, and play start position information may be selected based on the identified data. In this case, a face recognizing means, for example, may be provided in play start position information selector 304. Play start position information may also be selected using time information obtained from a built-in clock or the like and information such as positional information and the latest updating time obtained from an apparatus such as a GPS (Global Positioning System) or the like, rather than from the recognizing means. Therefore, various selecting processes are available.

When the user operates user commander 340 to enter an ID and a play request for a certain content, play start position checker 301 reads play start position information selected by play start position information selector 304 from play start position information storage unit 320, and specifies a play start position for the content indicated by the user. Specific details of the operation of play start position checker 301 will be described later.

Play start position information exchanger 302 transmits and receives play start position information to and from another content playing apparatus via communication unit 330. Play start position information exchanger 302 performs a process of reading play start position information selected by play start position information selector 304 from play start position information storage unit 320 and transmitting the play start position information to another content playing apparatus via communication unit 130, and a process of writing play start position information received from another content playing apparatus into play start position information storage unit 320.

When the user operates user commander 340 to enter a stop request for the content, play start position information updater 303 extracts start position information that is representative of a position at which the content that has been requested to be stopped and then stopped from being played, and updates the play start position information selected by play start position information selector 304 and stored in play start position information storage unit 320.

Figure 4:
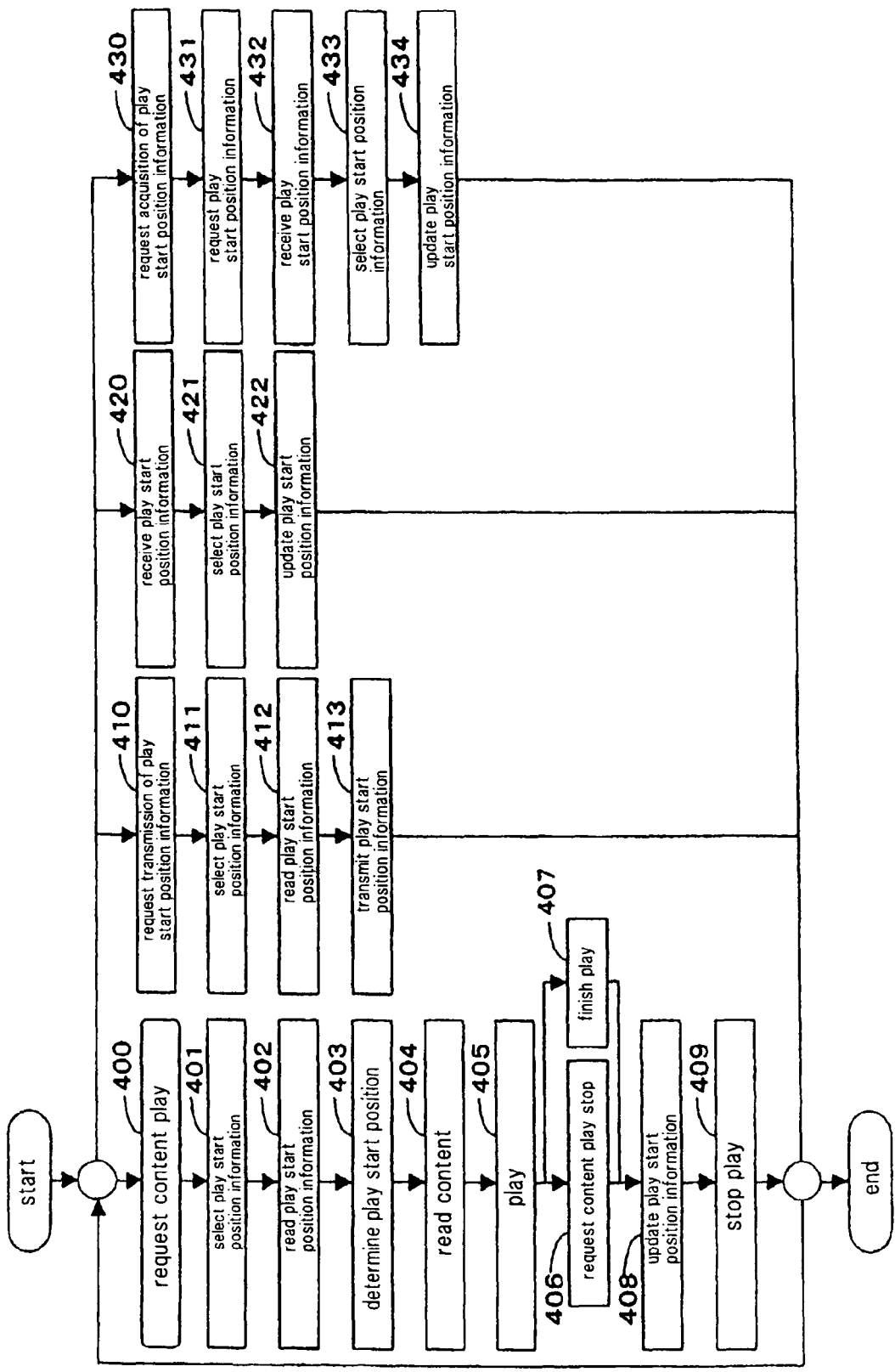
FIG. 4 is a flowchart of a processing sequence of the content playing apparatus according to the second exemplary embodiment of the present invention.

Operation of the content playing apparatus according to the present exemplary embodiment will be described below with reference to the block diagram shown in FIG. 3 and a flowchart shown in FIG. 4.

When a play request including information regarding a indicated content is entered from user commander 340 in step 400, play start position information selector 304 selects play start position information in step 401. Play start position checker 301 reads the play start position information selected by play start position information selector 304 from play start position information storage unit 320 in step 402, and derives a play start position in step 403. In step 404, play controller 300 reads content information from content storage unit 310, and transmits the content information and the play start position derived by play start position checker 301 to content player 350. In step 405, contents player 350 starts playing the contents from the play start position. If a content play stop request is entered from user commander 340 in step 406, or if the play of the content is finished in step 407, play controller 300 extracts the present play position information. In step 408, play start position information updater 303 updates the play start position information with the latest play position information and stores the play start position information in play start position information storage unit 320. In step 409, play controller 300 stops playing the content.

When a play start position information transmitting command request is entered from user commander 340 or a play start position information transmitting command is received from another content playing apparatus via communication unit 330 in step 410, play start position information selector 304 selects play start position information in step 411. Play start position information exchanger 302 reads the play start position information selected by play start position information selector 304 from play start position information storage unit 320 in step 412, and transmits the selected play start position information to an indicated terminal via communication unit 330 in step 413.

When play start position information is received from another content playing apparatus via communication unit 330 in step 420, play start position information selector 304 selects play start position information saved in play start position information storage unit 320 based on the received play start position information in step 421. In step 422, play start position information exchanger 302 updates the play start position information selected in step 421 and saved in play start position information storage unit 320.

When a play start position information acquisition command request is entered from user commander 340 in step 430, play start position information exchanger 302 transmits a play start position information request to another content playing apparatus via communication unit 330 in step 431, and receives play start position information via communication unit 330 in step 432. In step 433, play start position information selector 304 selects play start position information saved in play start position information storage unit 320 based on the received play start position information. In step 434, play start position information exchanger 302 updates the play start position information selected in step 433 and saved in play start position information storage unit 320.

A process in which play start position checkers 101, 301 derive a play start position will be described below. According to the most basic process, play start position information storage unit s 120, 320 store information (see FIG. 5) representing a pair of an ID for identifying a content stored on the terminal or on a terminal connected to a network and a start time, into a format such as a table, a database, or a file, and when contents are indicated by user commanders 140, 340, play start position checkers 101, 301 derive a start time paired with the content ID of the indicated content from play start position information storage units 120, 320 and use the derived start time as indicating a play start position.

If the same content is stored in a plurality of terminals based on copying between the terminals or simultaneous recording in the terminals, then it is desirable for the content to have the same content ID. The content ID may be information including a recorded time and a recorded channel, a program name, a unique ID given by the terminal when the content is recorded for the first time, or a program ID transmitted from the broadcasting station.

Play start position information storage units 120, 320 store, as play start position information, the image information of a frame at a play start point, and store image features including an edge, a color layout, a color histogram, or a combination thereof, extracted from the image information of the frame. When a content to be stored on the terminal is indicated by user commander means 140, 340, play start position checkers 101, 301 compare images or image features of frames of the content and the images or image features stored in play start position information storage units 120, 320 with each other. If there is a frame which agrees with or is significantly similar to a stored image, then the frame of the content can be used as a start position.

Figure 6:
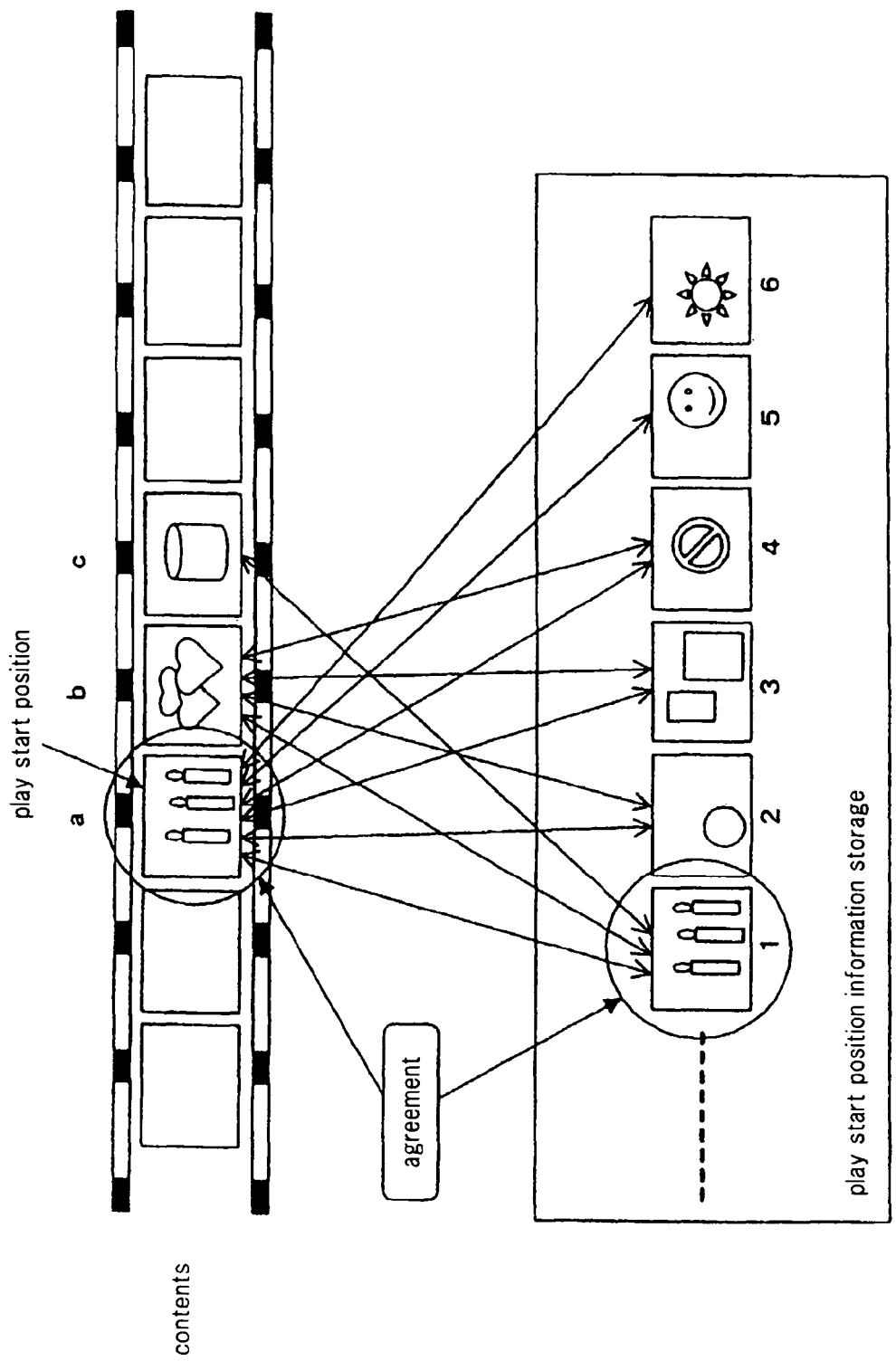
FIG. 6 is a diagram illustrative of a process of determining a content play start position based on content information (medium information)

FIG. 6 is a diagram illustrative of a process in which play start position checkers 101, 301 derive a play start position. In the example shown in FIG. 6, play start position checkers 101, 301 compare images (1, 2, 3, 4, 5, 6 ... ) in play start position information storage units 120, 320 and frame images (a, b, c, ... ) with each other for similarity. If play start position checkers 101, 301 judge that image 1 and frame image a are the same as each other, then play start position checkers 101, 301 determine frame a as representing a play start position.

In FIG. 6, a process has been described using frames of images. For higher accuracy, images or image information of a succession of frames may be held as play start position information, and may be matched in a chronological sequence. It is apparent that the process can be realized using speech or acoustic information or combined information thereof, rather than visual information.

One process of judging similarity between still images is a method disclosed, for example, in JP 2000-67248A entitled "Image matching method and apparatus". A process of judging agreement between time series is disclosed in JP.2000-339474A entitled "Apparatus and method for calculating moving image similarity".

According to the present process, matching based on content IDs is unnecessary because there is no need for individual content IDs. Even if contents are edited and are only in partial agreement, they can be played from the same position.

Based on the stop position information, play start position information updaters 103, 303 generate play start position information and update the play start position information stored in play start position information storage units 120, 320.

The present exemplary embodiment offers the following advantages:

1) By managing play start position information for each user or by performing a process of obtaining play start position information from a certain terminal and determining a play start position, it is possible to play contents depending on the user or situation. By separately storing play start position in formation of a plurality terminals and comparing the play start position information after checking them, it is possible to update the play start position information for each of the terminals without matching the contents.

2) By obtaining, by a person other than the user, play start position information generated at another terminal through play start position information updater 303 and determining a play position, it is possible to control a play start position between users and to simultaneously reporting the play start position information of a particular individual to a plurality of users.

3) By checking a play start position with play start position checker 301 based on medium information such as video features, rather than information including a program and a time code, it is possible to perform continuous play even if video data on a plurality of terminals are not identical due to editing, cutting, and terminal-specific summaries.

3rd Exemplary Embodiment

Figure 7:
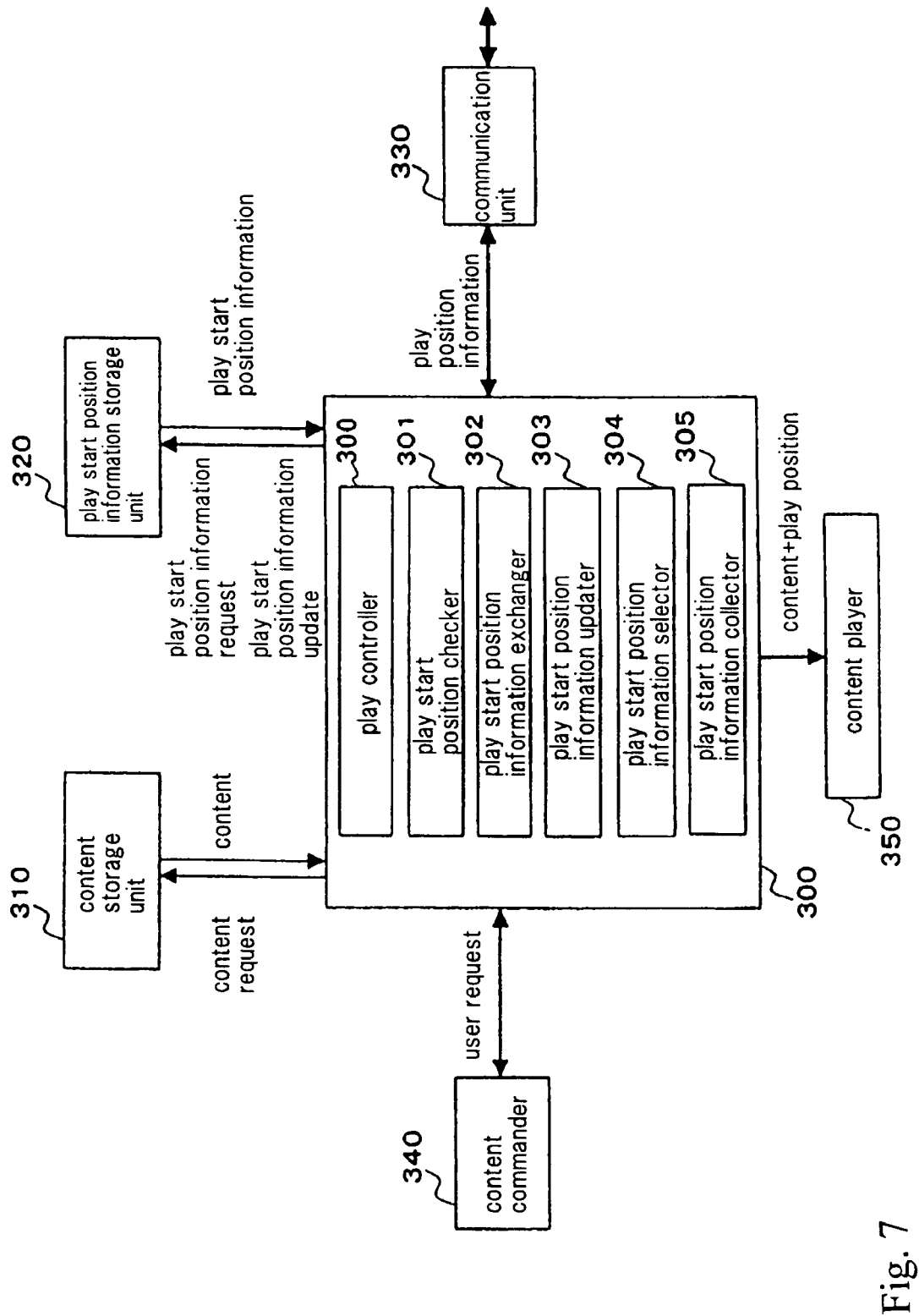
FIG. 7 is a block diagram of a content playing apparatus according to a third exemplary embodiment of the present invention.

Referring to FIG. 7, a content playing apparatus according to a third exemplary embodiment includes play start position information collector 305 added to the content playing apparatus shown in FIG. 3. Other details of the content playing apparatus are identical to those of the content playing apparatus according to the second exemplary embodiment, and will not be described below.

According to the present exemplary embodiment, the content playing apparatus shown in FIG. 3 additionally includes play start position information collector 305 for recognizing terminals connected to a terminal and for collecting play start position information from the play start position information storage unit s of all the terminals, and play start position information selector 304 selects play start position information from the collected information. Play start position information selector 304 selects the latest play start position information for the same user.

Play start position information from the respective terminals connected to the network may be stored for the respective terminals, and when the user enters a play request, play start position checker 301 may check the play start position information against all the play start position information stored in play start position information storage unit 320, and play start position information selector 304 may compare the final updated time of a play start position corresponding to the indicated content obtained by the check against the respective play start position information, with the start position, and may select the updated time which is the latest or which has the latest start position, or a play start position applied according to standards based on a play start position.

As described above, simply by storing the latest play start position information transmitted from each terminal on a terminal basis, it is possible to perform a play on the finally viewed terminal without play start position information updater 303 and play start position checker 301 taking the terminal into account. The play start position information generated in each terminal may cover or may not cover all the contents in the network.

If play start position checkers 101, 301 fail to specify a play start position for the content indicated by the user, then the content can be played from the beginning thereof.

In the above exemplary embodiments, a terminal has been described as an example of an attribute of play start position information. However, it is apparent that the attribute may be other conditions such as an updated time, a region, or the like.

Figure 8:
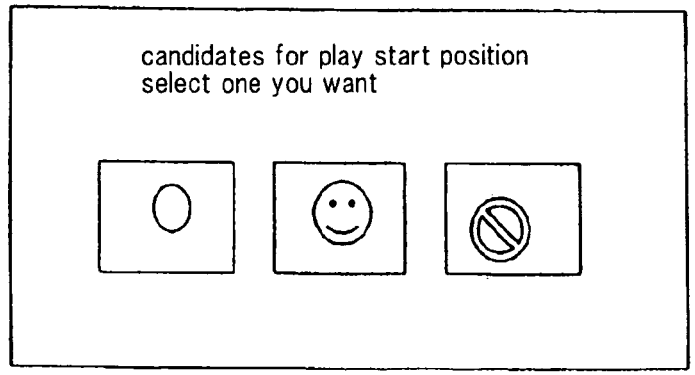
FIG. 8 is a diagram showing an example of a user interface for a plurality of content play start candidate points.

Play start position information updaters 103, 303 may not only update play start position information based on a stop action, but also update play start position information based on an editing means such as the entry of a command from the user. In this case, it is possible to assign a plurality of play start points to one item of play start position information. Play start position checkers 101, 301 output a plurality of frames as candidates for play start positions. It is also possible to present a plurality of candidates for the user to select, for example (see FIG. 8).

In addition to the process of exchanging play start position information between terminals, it is possible to realize an exemplary embodiment wherein contents including contents subsequent to a play start position based on play start position information are newly generated and transmitted to another terminal.

Examples of connections between content playing apparatuses according to the present invention will be described below. FIGS. 9, 10, 11, 12, and 13 are diagrams illustrative of examples of processes of connecting content playing apparatuses.

Figure 9:
FIG. 9 is a diagram illustrative of an example of a process of connecting a plurality of content playing apparatuses.

FIG. 9 is a diagram illustrative of an example of a process of connecting terminals for continuously playing contents. In the example shown in FIG. 9, two terminals 10A, 10B are directly connected to each other without a network interposed therebetween.

Terminal 10B transfers play information to terminal 10A at all times. In terminal 10A, play start position information selector 304 selects play start position information to be updated, depending on time information such as an updated time and attribute information such as a user, and adopts and updates play start position information of one of terminals 10A and 10B.

For example, if terminal 10A comprises a mobile terminal and terminal 10B comprises a home terminal, then the viewing history on the mobile terminal is automatically taken over by the home terminal.

Figure 10:
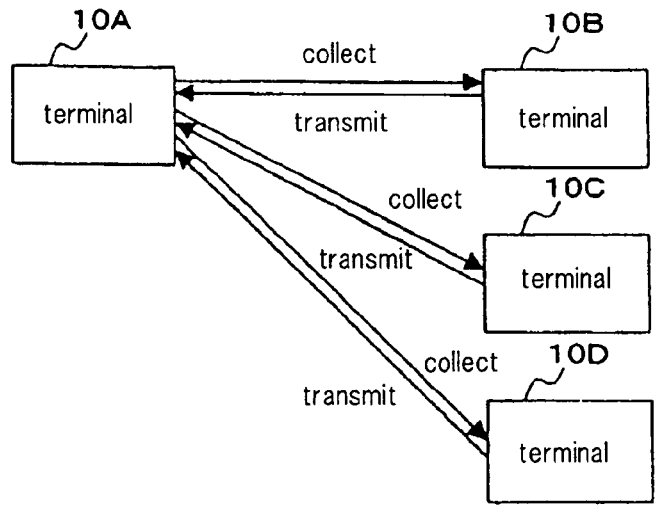
FIG. 10 is a diagram illustrative of an example of a process of connecting a plurality of content playing apparatuses.

FIG. 10 shows an example in which a plurality of terminals 10B, 10C, and 10D are connected to terminal 10A. The viewing histories on terminals 10B, 10C, and 10D are reflected in terminal 10A, so that the latest contents play start position information is saved on terminals 10A, 10B, 10C, and 10D for continuous play. According to an application, terminal 10A comprises a home terminal and each of terminals 10B, 10C, and 10D comprises a mobile terminal.

Figure 11:
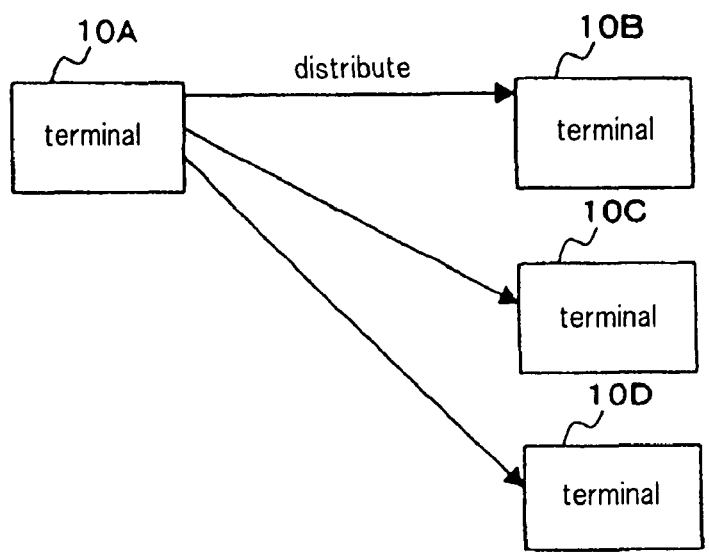
FIG. 11 is a diagram illustrative of an example of a process of connecting a plurality of content playing apparatuses.

FIG. 11 shows an example in which the content play start position information of terminal 10A is distributed to a plurality of terminals. The example may be applied to an application wherein terminal 10A generates contents and simultaneously reports play start position information.

Figure 12:
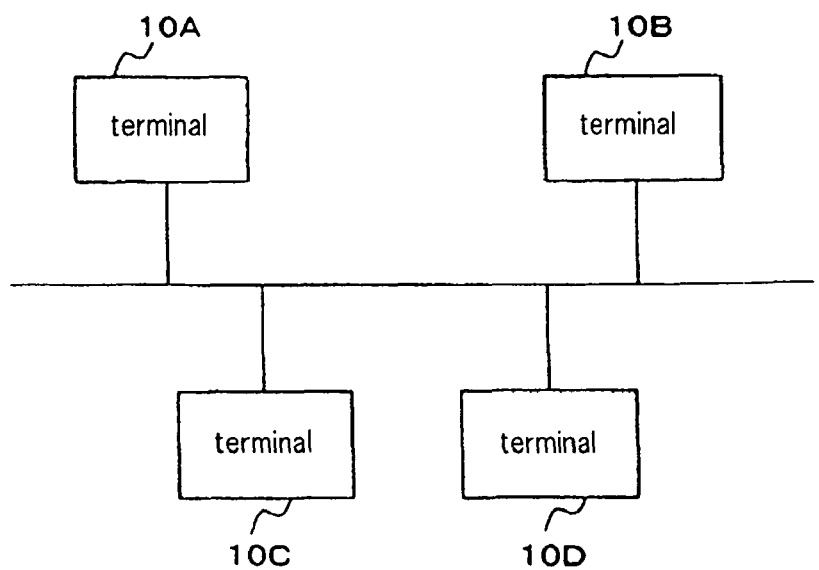
FIG. 12 is a diagram illustrative of an example of a process of connecting a plurality of content playing apparatuses.

FIG. 12 is an example in which each of the terminals is connected to a network. This example is particularly effective for synchronizing the content playing apparatus in respective rooms at home.

Figure 13:
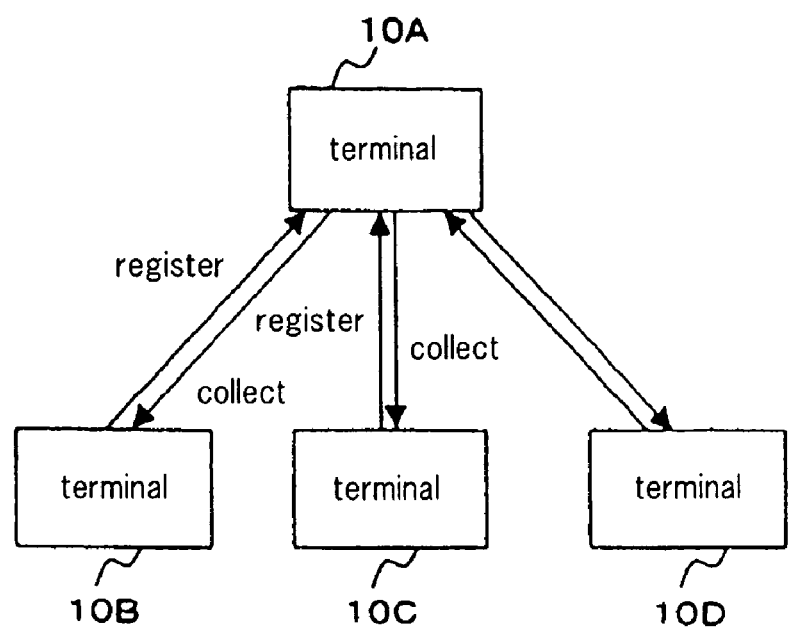
FIG. 13 is a diagram illustrative of an example of a process of connecting a plurality of content playing apparatuses.

FIG. 13 shows an extension of the form shown in FIG. 10. Terminal 10A comprises a server for collecting information of all the terminals and distributing the results to all the terminals. Terminals 10A, 10B, 10C, and 10D shown in FIGS. 10 through 13 may be connected through a home LAN or the like or through the Internet. Terminal 10A may comprise a content play control server dedicated for content play control.

The content playing apparatus according to the present invention may be implemented by recording a program for performing the functions thereof in a computer-readable recording medium, and having a computer read and run the program recorded in the recording medium. The computer-readable recording medium may be a recording medium such as a flexible disk, a magneto-optical disk, a CD-ROM, or the like, or a storage unit device such as a hard disk drive or the like incorporated in a computer system. The computer-readable recording medium may also be a medium for holding a program for a certain period of time, such as a medium (a transmission medium or a transmission wave) for dynamically holding a program, used, for example, when the program is transmitted through the Internet, or a volatile memory in a computer which serves as a server in this case.

INDUSTRIAL APPLICABILITY

The present invention is effectively applicable to a content playing apparatus which is capable of playing content whose play has been stopped in progress, from the position at which the production has been stopped.

The invention claimed is:

1. In a terminal, a method of playing stored contents, comprising the steps of:
receiving play start position information indicating a position at which to start playing a content, which is transmitted from another terminal, and storing the play start position information in play start position information storage means;
when there is a command to play a content, determining a play start position for the content, by checking the play start position information stored in the play start position information storage means against content information including information about the content; and
playing said content from the determined play start position,
wherein the play start position information includes visual or acoustic information at or near the play start position,
said step of determining a play start position comprises checking, when a content is indicated, the visual or acoustic information of the indicated content against the visual or acoustic information at or near the play start position included in the play start position information to determine the play start position for the content.

2. The method according to claim 1, further comprising the step of: each time the play of the content is stopped, extracting information representing a position at which to play the content at the time, and generating play start position information including the extracted information.

3. The method according to claim 1,
wherein said play start position information includes content identification information for identifying the content; and
wherein said step of determining a play start position comprises, when a content is indicated, detecting play start position information about the indicated content using said content identification information, and determining a play start position for the content according to the detected play start position information.

4. The method according to claim 1, wherein said step of transmitting play start position information comprises transmitting the stored play start position information to another terminal connected to the terminal via a communication network.

5. The method according to claim 1,
wherein said play start position information includes content identification information and a time code representing time information of the play start position for the content; and
wherein said step of determining a play start position comprises, when a content is indicated, acquiring the time code representing the play start position information about the indicated content using said content identification information to determine the play start position for the content.

6. The method according to claim 1, further comprising the step of: transmitting play start position information generated at a prescribed timing and indicating a position at which to start playing the content, to one or more other terminals.

7. The method according to claim 1,
wherein said play start position information comprises a plurality of items of information in respective areas;
wherein said step of storing the play start position information comprises storing said play start position information in the respective areas in said play start position information storage means; and
wherein said step of determining a play start position comprises selecting one of the areas of said play start position information based on a given condition, and determining a play start position based on the play start position information in the selected area.

8. The method according to claim 6, wherein said step of transmitting play start position information comprises transmitting the stored play start position information to another terminal directly connected to the terminal.

9. The method according to claim 7,
wherein said step of storing the play start position information comprises storing said play start position information in respective user-dependent areas in said play start position information storage means; and
wherein said step of determining a play start position comprises identifying a user, outputting information indicative of the user, selecting a user-dependent area of the play start position information based on the output information indicative of the user, and determining a play start position based on either an updated time and date or a play start position of the play start position information in the selected user-dependent area.

10. The method according to claim 7,
wherein said step of storing the play start position information comprises storing said play start position information in respective terminal-dependent areas in said play start position information storage means; and
wherein said step of determining a play start position comprises selecting a terminal-dependent area of the play start position information based on a given condition, and determining a play start position based on either an updated time and date or a play start position of the play start position information in the selected terminal-dependent area.

11. The method according to claim 10, wherein said step of storing the play start position information comprises collecting play start position information stored in other terminals, and storing the collected play start position information in the respective terminal-dependent areas in said play start position information storage means.

12. In a terminal, a method of playing stored contents, comprising the steps of:
at each terminal:
transmitting play start position information generated at a prescribed timing and indicating a position at which to start playing a content, to a management terminal which manages play start positions in the terminals;
at said management terminal:
receiving said play start position information transmitted from each of the terminals, and storing the play start position information in play start position information storage means;
at one of said terminals which is instructed to play the content:
requesting said management terminal for play start position information;
at said management terminal:
in response to the request from the terminal which is instructed to play a content, transmitting the play start position information to said terminal;
at said terminal which is instructed to play a content:
receiving the play start position information from said management terminal, and determining a play start position for the content, by checking the received play start position information against content information including information about the content; and
playing said content from the determined play start position,
wherein the play start position information includes visual or acoustic information at or near the play start position,
said step of determining a play start position comprises checking, when a content is indicated, the visual or acoustic information of the indicated content against the visual or acoustic information at or near the play start position included in the play start position information to determine the play start position for the content.

13. The method according to claim 12, further comprising the step of: each time the play of the content is stopped, extracting information representing a position at which to play the content at the time, and generating play start position information including the extracted information.

14. The method according to claim 12,
wherein said play start position information includes content identification information for identifying the content; and
wherein said step of determining a play start position for the content comprises, when a content is indicated, detecting play start position information about the indicated content using said content identification information, and determining a play start position for the content based on the detected play start position information.

15. The method according to claim 12, wherein said step of transmitting play start position information comprises transmitting the stored play start position information to another terminal directly connected to the terminal.

16. The method according to claim 12, wherein said step of transmitting play start position information comprises transmitting the stored play start position information to another terminal connected to the terminal via a communication network.

17. The method according to claim 12,
wherein said play start position information includes content identification information and a time code representing time information of the play start position for the content; and
wherein said step of determining a play start position comprises, when a content is indicated, acquiring the time code representing the play start position information about the indicated content using said content identification information to determine the play start position for the content.

18. The method according to claim 12,
wherein said play start position information comprises a plurality of items of information in respective areas;
wherein said step of storing the play start position information comprises storing said play start position information in the respective areas in said play start position information storage means; and
wherein said step of determining a play start position comprises selecting one of the areas of said play start position information based on a given condition, and determining a play start position based on the play start position information in the selected area.

19. The method according to claim 18,
wherein said step of storing the play start position information comprises storing said play start position information in respective user-dependent areas in said play start position information storage means; and
wherein said step of determining a play start position comprises identifying a user, outputting information indicative of the user, selecting a user-dependent area of the play start position information based on the output information indicative of the user, and determining a play start position based on either an updated time and date or a play start position of the play start position information in the selected user-dependent area.

20. The method according to claim 18,
wherein said step of storing the play start position information comprises storing said play start position information in respective terminal-dependent areas in said play start position information storage means; and
wherein said step of determining a play start position comprises selecting a terminal-dependent area of the play start position information based on a given condition, and determining a play start position based on either an updated time and date or a play start position of the play start position information in the selected terminal-dependent area.

21. The method according to claim 20, wherein said step of storing the play start position information comprises collecting play start position information stored in other terminals, and storing the collected play start position information in the respective terminal-dependent areas in said play start position information storage means.

22. An apparatus for playing stored contents, comprising:
play start position information exchanging means for receiving play start position information indicating a position at which to start playing a content, which is transmitted from a terminal other than the apparatus, and for storing the play start position information in play start position information storage means; and
play start position checking means for checking, when there is a command to play a content, the play start position information stored in the play start position information storage means against content information
including information about the content to determine the
play start position for the content, wherein the play start position information includes visual
or acoustic information at or near the play start position, said play start position checking means checks, when a
content is indicated, the visual or acoustic information of
the indicated content against the visual or acoustic information at or near the play start position included in the
play start position information to determine the play
start position for the content.

23. The apparatus according to claim 22, further comprising:
content storing means for storing contents;
user commander means for outputting information representing a command of a user to play or stop a content; and
content playing means for reading a content stored in said content storing means and for playing said content from the play start position determined by said play start position checking means.

24. The apparatus according to claim 22, wherein said play start position information storage means comprises means for storing said play start position information and means for editing said play start position information depending on the command of the user.

25. An apparatus for playing stored contents, comprising:
play start position information exchanging means for transmitting play start position information generated at a prescribed timing and indicating a position at which to start playing a content, to a management terminal which manages play start positions in the terminals, for receiving the play start position information transmitted from said management terminal, and for storing the play start position information in play start position information storage means;
control means for requesting said management terminal for play start position information when there is a command to play a content; and
play start position checking means for checking the play start position information stored in the play start position information storage means against content information including information about the content to determine the play start position for the content,
wherein the play start position information includes visual or acoustic information at or near the play start position,
said play start position checking means checks, when a content is indicated, the visual or acoustic information of the indicated content against the visual or acoustic information at or near the play start position included in the play start position information to determine the play start position for the content.

26. The apparatus according to claim 25, further comprising:
content storing means for storing contents;
user commander means for outputting information representing a command of a user to play or stop a content; and
content playing means for reading a content stored in said content storing means and for playing said content from the play start position determined by said play start position checking means.

27. The apparatus according to claim 25, wherein said play start position information storage means comprises means for storing said play start position information and means for editing said play start position information depending on the command of the user.

28. A non-transitory computer-readable medium having instructions to enable a computer in a terminal to play stored contents, the instructions being executable by one or more computers to cause the one or more computers to perform operations comprising:
receiving play start position information indicating a position to start playing a content, which is transmitted from another terminal, and storing the play start position information in play start position information storage means; and
determining a play start position for a content when there is a command to play the content, by checking the play start position information stored in said play start position information storage means against content information including information about the content,
wherein the play start position information includes visual or acoustic information at or near the play start position,
said determining a play start position checks, when a content is indicated, the visual or acoustic information of the indicated content against the visual or acoustic information at or near the play start position included in the play start position information to determine the play start position for the content.

29. A non-transitory computer-readable medium having instructions to enable a computer in a terminal to play stored contents, the instructions being executable by one or more computers to cause the one or more computers to perform operations comprising:
transmitting play start position information generated at a prescribed timing and indicating a position at which to start playing a content to a management terminal which manages play start positions in a plurality of terminals;
requesting said management terminal for play start position information when there is a command to play a content; and
receiving the play start position information from said management terminal, determining a play start position for the content, by checking the received play start position information against content information including information about the content,
wherein the play start position information includes visual or acoustic information at or near the play start position,
said determining a play start position checks, when a content is indicated, the visual or acoustic information of the indicated content against the visual or acoustic information at or near the play start position included in the play start position information to determine the play start position for the content.

30. A content playing system comprising a plurality of content playing apparatuses for playing stored contents, said content playing apparatuses being connected to each other by way of a communication network, each of said content playing apparatuses comprising:
control means for requesting one or more of the other content playing apparatuses for play start position information indicating a position at which to start playing a content when there is a command to play the content;
play start position information exchanging means for receiving play start position information transmitted from said one or more of the other content playing apparatuses, and for storing the play start position information in play start position information storage means; and
play start position checking means for checking the play start position information stored in the play start position information storage means against content information including information about the content to determine the play start position for the content, wherein the play start position information includes visual or acoustic information at or near the play start position, said play start position checking means checks, when a content is indicated, the visual or acoustic information of the indicated content against the visual or acoustic information at or near the play start position included in the play start position information to determine the play start position for the content.

31. A content playing system comprising a plurality of content playing apparatuses for playing stored contents, said content playing apparatuses being connected to each other by way of a communication network, each of said content playing apparatuses comprising:

play start position information exchanging means for, when it has generated play start position information indicating a position at which to start playing a content, for transmitting the play start position information to one or more of the other content playing apparatuses, for receiving play start position information from said one or more of the other content playing apparatuses, and for storing the play start position information in play start position information storage means; and play start position checking means for checking, when there is a command to play a content, the play start position information stored in the play start position information storage means against content information including information about the content to determine the play start position for the content, wherein the play start position information includes visual or acoustic information at or near the play start position, said play start position checking means checks, when a content is indicated, the visual or acoustic information of the indicated content against the visual or acoustic information at or near the play start position included in the play start position information to determine the play start position for the content.

32. A content playing system comprising a plurality of content playing apparatuses for playing stored contents, said content playing apparatuses being connected to each other by way of a communication network, each of said content playing apparatuses comprising:

play start position information exchanging means for generating play start position information indicating a position at which to start playing a content, for transmitting the play start position information to one of the content playing apparatuses when said one of the content playing apparatuses is indicated, for receiving play start position information from said indicated one of the content playing apparatuses, and for storing the play start position information in play start position information storage means; and play start position checking means for checking the play start position information stored in the play start position information storage means against content information including information about the content to determine the play start position for the content;

wherein a terminal indicated by said user comprises play start position information exchanging means for receiving the play start position information transmitted from said content playing apparatus and for transmitting the play start position information to one or more of the other content playing apparatuses.

33. A content play control server for providing play start position information indicating a position at which to start playing a content to one or more terminals connected by way of a communication network, the server comprising:

play start position information exchanging means for receiving play start position information transmitted from said one or more terminals and indicating a position at which to start playing a content, for storing the play start position information in play start position information storage means, and for transmitting the play start position information stored in said play start position information storage means to said one or more terminals when there is a command to play a content, and wherein the play start position information includes visual or acoustic information at or near the play start position.

* * * * *